United States Patent Office 2,938,879
Patented May 31, 1960

2,938,879

NON-BLOCKING POLYETHYLENE COMPOSITIONS

Henry W. Mock, Elizabeth, and Walter A. Haine, Scotch Plains, N.J., assignors to Union Carbide Corporation, a corporation of New York No Drawing. Filed Oct. 18, 1955, Ser. No. 541,306

7 Claims. (Cl. 260—32.6)

This invention relates to improved polyethylene compositions and more particularly to compositions having a lower coefficient of friction, improved extrusion characteristics, better clarity and substantial freedom from blocking tendencies.

Conventional polyethylene films block badly, i.e., do not slip readily over each other. This tendency of film layers to block (adhere to each other) is aggravated by higher temperature and when the contact pressure is increased as by winding the film into rolls or piling film or bags into stacks. Poor slip behavior makes handling of such films difficult and severely limits their use in automatic processing equipment since the film must pass freely through the fabricating machine (e.g., heat sealer, bag maker, bag loading, packaging) for it to operate properly and reproducibly.

One convenient measure of a film's slip is its kinetic coefficient of friction as determined by the inclined-plane method subsequently described. Coefficients exceeding 0.60 indicate poor slip; values of 0.60 to 0.46 indicate fair (marginal) slip, i.e., the films would be useful in certain applications but not entirely satisfactory for others; and values of 0.45 or less indicate good slip.

Different batches of commercial film, and even different specimens from a single film, made from conventional polyethylene exhibit coefficients of friction ranging from 0.35 to 0.95, with a high percentage of the values falling above 0.60. This data indicates not only the poor slip behavior of the prior art materials, but also their non-reproducibility and non-uniformity with respect to this property.

Conventional polyethylene resins are deficient also, in the extrusion characteristics required for the consistent production of high quality thin films. For instance, polyethylene resin uniformity is poor as evidenced by the presence of fish-eyes, gel clusters, off-color granules, brush heaps (molecular aggregates or micellae), etc. This results in rough film surfaces and seriously limits drawdown. While these properties as well as film strength and clarity can be improved by more intensive compounding procedures and higher extrusion temperatures, said process modifications are not practicable with conventional polyethylene resins since they further reduce slip. Similarly, polymerization procedures can be varied in known fashions to up-grade certain properties, e.g. clarity; but these too are impractical because they affect slip adversely.

Extruded thin film, say 1-10 mil, is made by extruding polyethylene through a relatively large (20-40 mil) die, then stretching (or "drawing down") the molten material rapidly to the desired film thickness and cooling it by passage through a water bath or cold air stream. "Drawdown" is the ability to be stretched or drawn down in this manner at an acceptable rate without tearing or forming holes, slits or other irregularities. The "acceptable rate" depends, of course, on the particular extrusion rate, die opening, and film thickness involved.

Films, filaments, moldings, extruded contours, etc. made from conventional polyethylene are prone to develop strong electrostatic charges on their surfaces which attract thereto heavy dust deposits. These highly charged surfaces are especially troublesome during the processing of thin, flexible materials, such as during the spinning and weaving of fibers or during the printing, sealing and slitting of thin films or during bag-loading or packaging operations, because they make proper manipulation difficult.

It has now been found that the conjoint addition of from 0.005 percent to up to about 1.25 percent by weight of an amide of a higher fatty acid and from 0.003 percent to as much as two percent by weight of a polyethylene antioxidant and particularly a hindered phenol or a secondary aromatic amine, to a normally solid polyethylene has a surprising synergistic effect in greatly improving the polyethylene's extrusion behavior, homogeneity as evidenced by fewer fish eyes and gel clusters, as well as its gloss, clarity and slip, together with a greatly reduced propensity to block and to acquire electrostatically charged surfaces.

The term amide of a higher fatty acid is intended to apply to amides of saturated and unsaturated water-insoluble monocarboxylic acids and particularly those having from 10 to 22 carbon atoms in the molecule such as are present as free acids or their glycerides in fatty oils. Typical fatty acid amides found useful in obtaining the improved polyethylene compositions are the amide of lauric acid, the amide of myristic acid, the amide of palmitic acid, the amide of stearic acid, the amide of oleic acid, and the amide of linoleic acid. Either an individual fatty acid amide can be used satisfactorily or a mixture of such amides to yield substantially equivalent results. In most instances the commercially available fatty acid amides are mixtures of various fatty acid amides and may contain up to about five percent by weight of free fatty acid. Such mixtures have been found to effectively impart the desired novel properties.

The optimum concentration of fatty acid amide depends on both the structure of the particular polyethylene resin involved and the nature and amounts of other non-resinous components such as pigments, fillers and the like present in the composition, but in general, the following concentrations (based on resin weight) are inclusive of the optimum concentrations, namely:

Percent by weight
(a) In unfilled, unpigmented compounds____ 0.005–0.1
(b) In filled and/or pigmented compounds __ 0.005–1.25

The most effective anti-oxidants for polyethylene are the hindered phenols and the secondary aromatic amines. The hindered phenols provide good color, while the amines are poor in this respect. Consequently, the phenols are used whenever color considerations are involved, even though the amines are generally regarded as more effective in other respects such as high temperature stabilization and oxidation resistance. The anti-oxidant concentration in the polyethylene composition can vary from as little as 0.003 percent by weight of the polyethylene to as much as two percent. Generally a concentration of anti-oxidant between 0.005 and 0.3 percent is preferred.

Examples of hindered phenols having an anti-oxidant effect on polyethylene are:

2,6-di-tert.-butyl-4-methylphenol
2,6-tert.-butyl-4-methoxyphenol
Bis(2-methyl-4-hydroxy-5-tert.-butyl-phenyl) sulfide
2,2-bis(4-hydroxyphenyl)propane
Bis(2-hydroxy-3-tert.-butyl-5-methylphenyl) methane
Bis(2-hydroxy-3-tert.-butyl-5-ethylphenyl) methane Also within the category of effective hindered phenol type anti-oxidants are the drying oil-soluble resinous condensation products of formaldehyde and alkyl or phenyl substituted monohydric phenol as for example oil-soluble condensation products of para-tert.-amylphenol and formaldehyde; of para-phenyl phenol and formaldehyde; and of mixtures of such phenols and formaldehyde.

The hindered phenols include those compounds wherein the phenolic properties of the phenolic hydroxy group are modified by the presence of another group on the phenolic ring as set forth by Stillson, Sawyer & Hunt in Journal of the American Chemical Society, vol. 67, 303–307 (1944) in the article "The Hindered Phenols" and by H. Morawetz in Industrial and Engineering Chemistry, vol. 41, 1442–1447 (July 1949) in the article "Phenolic Antioxidants for Paraffinic Materials."

Examples of secondary aromatic amines having an anti-oxidant effect on polyethylene include N,N'-diphenyl-p-phenylenediamine and N,N'-dinaphthyl-p-phenylenediamine and in general, compounds of the formula:

where R is phenyl or naphthyl and R' is hydrogen, hydroxy, naphthylamino, phenylamino or alkyl ($C_4$ to $C_8$) inclusive.

The invention is further illustrated in the following examples, the scope of the invention, however, being not restricted thereto other than as defined in the appended claims. All parts recited are to be considered parts by weight.

The first two examples illustrate the processing behavior and properties of conventional polyethylene; Example 3 illustrates the effect on polyethylene of incorporating only a fatty acid amide. Example 4 describes the effect of an antioxidant alone in polyethylene. The remaining examples demonstrate the synergistic effect of having present in the polyethylene material both the fatty acid amide and an anti-oxidant.

EXAMPLE 1

Polyethylene resin having a melt index of 1.8 and density of 0.92 was extruded through a 6-inch barrel-diameter Hartig extruder fitted with an 82-inch end-fed linear die having a 20 mil opening. The hot (220° C.) 20 mil web emerging from the extruder was immediately stretched (or drawn down), passed through a 65–70° C. quenching bath, thence through a pair of "squeegee" rolls to remove the entrained water and onto a wind-up roll. The extrusion rate was 300 lbs./hr. The hot-stretch span, i.e., the distance from the extrusion die lips to the cooling bath surface, was about two inches. The windup rate of 100 ft./min. needed to draw down to 1.5 mils could not be attained without breaking the film.

EXAMPLE 2

Three-hundred-seventy pounds of the resin used in Example 1 were mixed and fluxed in a Banbury under a ram pressure of 50 p.s.i.g. for 5½ minutes. During this period, cooling water was circulated through the Banbury rotor and jacket at such a rate that the resin temperature rose gradually to 105° C. at 4¼ min. and to 120° C. during the ensuing 1¼ minutes. The resin was then extruded into a 14" wide by ⅛" thick sheet which was cooled and diced into roughly ⅛" cubes. The product had a melt index of 2.0 and a bulk factor of 1.97. When extruded, as in Example 1, at an extrusion rate of 300 lbs./hr. and a 100 ft./min. drawdown rate, 1.5 mil film was produced continuously for 1 to 1½ hours with no breaks. At higher drawdown rate, film breaks occurred.

EXAMPLE 3

Three-hundred-seventy pounds of the polyethylene resin used in Example 1 and 50.4 grams (0.03%) commercial grade oleamide (Armour's "Armid O," M.P. 68° C.; contains about 91 percent oleamide, 6 percent stearamide, 3 percent linoleamide of which about 3 percent is present as the free acids) were banburied together to a homogeneous mixture, extruded and diced as in Example 2. The product had a melt index of 2.0 and a bulk factor of 1.77. When extruded, as in Example 1, at an extrusion rate of 315 lbs./hr. and a drawdown rate of 105 ft./min., 1.5 mil film was produced continuously for 1 to 1½ hours with no breaks. At higher drawdown rates, film breaks occurred.

EXAMPLE 4

Three-hundred-seventy pounds of the polyethylene resin used in Example 1 and 33.6 grams (0.02%) 2,6-di-tert.-butyl p-cresol were banburied together, extruded, and diced as in Example 2. The product had a melt index of 2.1 and a bulk factor of 1.97. When extruded, as in Example 1, at an extrusion rate of 360 lbs./hr. and 120 ft./min. drawdown rate, 1.5 mil film was produced continuously for 1 to 1½ hours with no breaks. At higher drawdown rate, film breaks occurred.

EXAMPLE 5

Three-hundred-seventy pounds of the polyethylene resin used in Example 1, 50.4 grams (0.03%) commercial grade oleamide and 33.6 grams (0.02%) 2,6-di-tert.-butyl-4-methyl phenol were banburied together, extruded and diced as in Example 2. The product had a melt index of 2.1 and bulk factor of 1.78. When extruded, as in Example 1, at an extrusion rate of 450 lbs. per hour and 150 ft./minutes drawdown rate, 1.5 mil film was produced continuously for 1 to 1½ hours with no breaks. Higher drawdown rates could not be tried since the wind-up apparatus was incapable of speeds exceeding 150 ft./min.

Thin film was prepared from the polyethylene resin used in Example 1 by extruding it through a 2½ inch barrel-diameter National Rubber Machinery Co. extruder fitted with an end-fed linear die having a 12 inch by 20 mil orifice, then stretching the hot (225° C.) 20 mil web, quenching, removing the water and winding it in substantially the same manner described in Example 1. The quenching bath was at a temperature of 60° C. The hot-stretch span was 2 inches. Under these conditions, the thinnest film which could be prepared was 1.8 mil; and even at this thickness—or, stated another way, even at this drawdown rate—numerous breaks occurred. The diced polyethylene compounds of Examples 2, 3, 4 and 5 were extruded in this same fashion, and 1.5 mil film prepared from each at an extrusion rate of 36–38 lbs./hr. and a drawdown of 100 ft./min. The properties are shown in Table I.

*Table 1*

| | Ex. 1 | Ex. 2 | Ex. 3 | Ex. 4 | Ex. 5 |
|---|---|---|---|---|---|
| Percent Oleamide | | | 0.03 | | 0.03 |
| Percent 2,6-di-tert.-butyl-4-methyl phenol | | | | 0.02 | 0.02 |
| Granules or Dice: | | | | | |
| melt index | 1.8 | 2.0 | 2.0 | 2.1 | 2.1 |
| bulk factor | | 1.97 | 1.77 | 1.97 | 1.78 |
| odor development (min. to develop at 140° C. under $O_2$) | 60 | 60 | 30 | 360+ | 360+ |
| Extrusion Behavior: | | | | | |
| maximum drawdown rate from 20 to 1.5 mils (ft./min.) | (¹) | 100 | 105 | 120 | 150+ |
| 1.5 Mil Film: | | | | | |
| kinetic coefficient of friction | 0.54 | 0.76 | ² 0.36 | 0.74 | 0.18 |
| haze (percent) | 46 | 25 | 26 | 20 | 20 |
| light transmission, percent | 5 | 28 | 21 | 38 | 30 |
| specular gloss | 10 | 22 | 22 | 29 | 37 |
| bag-drop impact (ht. in ft.; average of 3 tests) | 2.6 | 2.6 | | | 3.8 |
| flame-treating for ink adhesion | good | good | fair | v. good | good |
| static build-up (electrostatic units) | 110 | 150 | | | 0 |

¹ Could not be drawndown to less than 1.8 mils.
² Very uneven slide; erratic cycles of acceleration and deacceleration.

It can be seen from Table I that the composition of Example 5 which contains both the fatty acid amide and the anti-oxidant is superior to the unmodified prior art material of Example 2 as regards melt index, bulk factor, odor development and drawdown, and that films prepared therefrom possess better slip, gloss, clarity, light transmission and impact strength. It can be seen, moreover, that some synergistic effect takes place when the fatty acid amide and the anti-oxidant are used in combination. That is, the effect of the combination is greater than the sum of the effects of its individual components. For example, the anti-oxidant itself (Ex. 4) has no effect on slip; but using it in combination with the fatty acid amide provides better and more uniform slip than that obtained from the amide alone. Similarly, the oleamide has no effect on gloss (Ex. 3 vs. Ex. 2); but the gloss provided by the combined action of the amide and the anti-oxidant exceeds that provided by the anti-oxidant alone. This effect occurs also with respect to the extrusion characteristics, where the improved drawdown provided by the combination of the fatty acid amide and anti-oxidant exceeds what would be expected from the sum of their individual contributions.

It can be seen from a comparison of Examples 1 and 2 that compounding the resin composition improves melt index, extrusion properties and film clarity, but decreases slip. In view of the fact that the degree of slip provided by the compositions of this invention is well in excess of that required for many applications, it is obvious that they can tolerate more intensive compounding than hitherto known materials and thereby provide films which would still have adequate non-blocking characteristics and possess even greater clarity.

EXAMPLE 6

Three lots of polyethylene resin of melt index 1.8, 2.0 and 1.8, respectively, were Banburied, sheeted and diced as in Example 2, (A) as is, and (B) with 0.03 percent commercial grade oleamide and 0.02 percent di-tert.-butyl p-cresol added. Both flat and tubular film were then extruded from each of these six materials. Films produced from the unmodified (A) compositions had kinetic coefficients of friction of 0.91, 0.88 and 0.89, respectively, while those produced from the corresponding modified (B) compositions had coefficients of 0.16, 0.05 and 0.17, respectively. During the tubular extrusions, the three unmodified (A) products averaged one blow hole per 10 minutes, while the three modified (B) products averaged only one blow hole per half hour, with two of the three samples running entirely free of such faults.

EXAMPLE 7

Portions of a polyethylene resin of melt index 1.9 were Banburied, sheeted and diced by the method of Example 2, (A) as is, and together with 0.02 percent 2,6-di-tert.-butyl-4-methyl phenol plus (B) 0.01%, (C) 0.02%, (D) 0.025%, (E) 0.030%, (F) 0.035%, (G) 0.05% and (H) 0.25% commercial grade oleamide and 1.5 mil film was extruded from each of these products. The films had the following kinetic coefficients of friction: (A) 0.92, (B) 0.51, (C) 0.34, (D) 0.25, (E) 0.18, (F) 0.15, (G) 0.10, (H) 0.08. The films prepared from compounds (D), (F) and (G) had average bag-drop impacts of 4.6, 4.2 and 4.4 ft., respectively, compared to 3.7 ft. for film prepared from (A), and showed excellent heat sealability.

Referring to the polyethylene compositions of Example 7, it can be seen that slip increases (i.e., coefficient of friction decreases) rapidly as the fatty acid amide concentration is increased up to about 0.02 to 0.025 percent, but that above this compatibility limit, say above about 0.025–0.030 percent, additional amide effects relatively little additional slip improvement.

It has also been observed that compounds containing polyethylene resins of different structure or non-resinous components such as pigments, fillers and the like which would be expected to have different degrees of compatibility with a given fatty acid amide, require different amounts of that material to attain comparable non-blocking attributes. For instance, the slip of a propylene chain-terminated polyethylene resin which had about three times as much internal unsaturation as the resin cited above, did not start to level off until the oleamide concentration reached about 0.06 percent. A polyethylene compound containing a few percent of carbon black required considerably higher concentrations. In the latter instance, the adsorptive forces of the carbon must probably be satisfied to some degree before effective amounts of fatty acid amide can reach the surface.

While, as just pointed out, the fatty acid amide and the antioxidant concentrations generally preferred for unpigmented, unfilled compounds will not generally confer the same degree of slip improvement to a compound containing carbon, or some other pigment or filler, this level of modifier concentration does effect a striking improvement in the extrudability, particularly in the drawdown, of such compositions. This is illustrated by the following example.

EXAMPLE 8

The formulations indicated below were Banburied, sheeted and diced according to the method of Example 2 and the drawdown of the products so obtained (i.e., the maximum rate, in ft./min., at which they could be drawn from 20 mil thickness to 1.5 mil thickness) was determined.

|  | A | B | C | D |
| --- | --- | --- | --- | --- |
| polyethylene resin | 100 | 97 | 96.98 | 96.95 |
| carbon black |  | 3 |  | 3 |
| 2,6-di-tert.-butyl-4-methyl phenol |  |  | 0.02 | 0.02 |
| "Armid O" |  |  |  | 0.03 |
| Drawdown | 100 | 68 | 92 | 135 |

It can be seen that carbon severely degrades extrudability, i.e., lowers drawdown from 100 to 68 ft./min., and that while an antioxidant partially rectifies the damage, it does not restore drawdown to the level of the corresponding unpigmented compound. It can also be seen that the modified composition of this invention (D), has almost 50 percent greater drawdown than the corresponding compound containing only antioxidant (C), and 35 percent better drawdown than even the corresponding unpigmented prior art composition (A).

In view of the effects of polyethylene resin structure, fillers, pigments, etc. on fatty acid amide and antioxidant effectiveness, it is preferred to determine the most favorable concentration for a given composition by sampling small batches. In this manner, the minimum concentration needed to provide the desired improvement is determined, and the maleffects of unduly high concentrations are avoided.

Excessive concentrations of fatty acid amide reduce friction too far, and rolls of film telescope or unravel and stacks of film or bags are disarrayed at the slightest provocation. Two much antioxidant causes discoloration. Excesses of fatty acid amide and/or antioxidant sweat out onto film surfaces and degrade appearance, sealability and treatability characteristics.

EXAMPLE 9

The following four materials were prepared from the diced product (B) of Example 6: (a) 1.5 mil flat film, (b) tubular film, (c) flame-treated tubular film, (d) printed tubular film. These and appropriate control films prepared from the diced product (A) of Example 6 were carefully tested and samples of each were then subjected to the following five aging treatments:

(i) 2 months at 60° C. and low relative humidity
(ii) 2 months at 29° C. and 85% relative humidity
(iii) 4 months at 23° C. and 50% relative humidity
(iv) 2 months at 0° C. and low relative humidity
(v) 2 months at −10° C. and 100% relative humidity Tests on the aged specimens showed that slip, blocking, impact strength, and in the case of the untreated samples (a) and (b)—flame-treatability and heat sealability, had remained unaltered in every instance. Both the flame-treated tubular films (c) and the corresponding controls showed a slight decrease in heat sealability; but the films made from the modified composition sealed slightly better in every instance (i.e., treated and untreated, aged and unaged) than the corresponding films made from the unmodified prior art composition. Treated surface effectiveness (of the (c) samples) and print adhesion (of the (d) samples) showed very slight improvements. Film odor had not intensified and appeared even less than before aging.

EXAMPLE 10

Twenty-five pounds of a polyethylene resin having a melt index of 2.3 and density of 0.92, 2.27 grams (0.02%) 2,6-di-tert.-butyl-4-methyl phenol and the amide indicated below were banburied together for 9½ minutes under a ram pressure of 80 p.s.i.g. with cooling water circulating through the Banbury rotor and jacket at such a rate that the mass temperature rose gradually to 120° C. during this period. The material was then sheeted on a two-roll mill at 100° C. for four minutes, cooled and granulated. The maximum drawdown of each compound was determined and 1.5 mil films were extruded from each. The slip agents used, the drawdown of the compounds and the kinetic coefficients of friction of the 1.5 mil films are shown below.

| | Slip Agent | Drawdown, mils at ft./min. | K.i. Coeffo of Friction |
|---|---|---|---|
| A | None | 1.3 at 98 | 0.74 |
| B | 0.02% oleamide | 0.8 at 122 | 0.36 |
| C | 0.05% oleamide | 1.0 at 115 | 0.31 |
| D | 0.02% lauramide | 1.1 at 112 | 0.40 |
| E | 0.05% lauramide | 0.8 at 120 | 0.29 |
| F | 0.02% stearamide-palmitamide | 1.0 at 115 | 0.39 |
| G | 0.05% stearamide-palmitamide | 1.1 at 112 | 0.35 |
| H | 0.02% stearamide | 0.7 at 120 | 0.34 |
| I | 0.05% stearamide | 0.7 at 120 | 0.33 |

Drawdown is expressed as the minimum thickness to which a 20 mil extruded stock could be drawn and the maximum speed at which it could be drawn down to this thickness. It can be seen that each of the compounds B through I had better drawdown than the control (A), i.e., could be stretched to a thinner film and at a higher speed, and that the films produced from those compounds had improved slip, i.e., lower coefficients of friction.

IDENTIFICATION OF FATTY ACID AMIDE USED IN EXAMPLE 10

The oleamide used in B and C was Armour's "Armid O."
The lauramide used in D and E was Armour's "Armid 12."
The stearamide-palmitamide mixture used in F and G was Armour's "Armid HT."
The stearamide used in H and D was Armour's "Armid 18."
The approximate percent by weight composition of these commercially available fatty acid amides is tabulated below:

| | "Armid O" | "Armid 12" | "Armid HT" | "Armid 18" |
|---|---|---|---|---|
| Melting point (approximate), °C | 68 | 97 | 98–100 | 100–104 |
| Amide of lauric acid ($C_{11}H_{23}CONH_2$) | | 90 | | |
| Amide of myristic acid ($C_{13}H_{27}CO)NH_2$ | | 9 | | |
| Amide of palmitic acid ($C_{15}H_{31}CO)NH_2$ | | | 25 | 6 |
| Amide of stearic acid ($C_{17}H_{35}CO)NH_2$ | 6 | | 70 | 93 |
| Amide of oleic acid ($C_{17}H_{33}CO)NH_2$ | 91 | 1 | 5 | 1 |
| Amide of linoleic acid ($C_{17}H_{31}CO)NH_2$ | 3 | | | |

It is generally preferred to add the amide and antioxidant prior to or during the mixing, fluxing, and compounding operation of the polyethylene in order to obtain the additional improvements in extrudability and film clarity provided by the more intensive compounding which can now be performed upon the material without prohibitively reducing slip. However, the modifiers can also be added at any other point prior to extrusion or molding such as on the two-roll mill or even right in the extruder hopper, so long as they become reasonably well mixed into the composition. Where improved slip is the primary object, they can even be blended with the resin granules prior to extrusion; and sufficient mixing then occurs in the extruder to give a uniform product. This is illustrated in the following example.

EXAMPLE 11

Twenty-five pounds of the diced polyethylene compound of Example 2, 2.27 grams (0.02%) 2,6-di-tert.-butyl-4-methyl phenol and 28.4 grams (0.25%) commercial grade oleamide, were thoroughly mixed by blending for five minutes at 80° C. The resin granules were not destroyed under these conditions. Extruded 1.5 mil films prepared from this compound had a kinetic coefficient of friction of 0.08.

The fatty acid amide concentration illustrated by Example 11 is relatively high for unpigmented, unfilled compositions. Dry blending to low overall concentrations also gives excellent slip. In fact, the degree of slip so obtained exceeds that provided by incorporating a like amount of modifiers in the Banbury. To illustrate:

EXAMPLE 12

The following three compounds were prepared from different portions of the same batch of polyethylene resin by the procedure of Example 2:

Cpd. A—resin only
Cpd. B—resin (100) + 2,6-di-tert.-butyl-4-methyl phenol (0.02 parts) + "Armid 0" (0.030 parts)
Cpd. C—resin (100 parts) + 2,6-di-tert.-butyl-4-methyl phenol (0.02 part) + "Armid 0" (0.025 part)

Two blends, (D) and (E), were then prepared by blending cpds. A and B together in the proportions indicated below for ½ hour at room temperature in a Hungerford Tumbler Blender:

Blend D—cpd. B (92 parts) + cpd. A (8 parts)
Blend E—cpd. B (83.3 parts) + cpd. A (16.7 parts)

1.5 mil films extruded from the modified compounds and blends had the following kinetic coefficients of friction:

Cpd. B (0.030% fatty acid amide) _____ 0.32
Bld. D (0.028% fatty acid amide) _____ 0.27
Bld. E (0.025% fatty acid amide) _____ 0.26
Cpd. C (0.025% fatty acid amide) _____ 0.40

Alternatively, each of the individual components of the modifier combination may be incorporated into a separate master batch compound, and these may then be dry blended together or with additional unmodified polyethylene compounds (by the methods of Examples 11 and 12 or other suitable procedures) to provide the desired modifier ratios. For example, a compound containing one percent 2,6-di-tert.-butyl-4-methyl phenol and another containing one percent "Armid 0" were made up; and appropriate amounts of these were blended with unmodified polyethylene compounds.

EXAMPLE 13

One-hundred pounds of a polyethylene resin having a molecular weight of about 19,000 and melt index of about 3.1 was Banburied, sheated and diced. One-hundred pounds of the same resin together with 2.27 grams (0.005%) 2,6-di-tert.-butyl-4-methyl phenol and 13.6 grams (0.030%) commercial grade oleamide ("Armid 0") was Banburied, sheeted and diced in exactly the same manner. The maximum drawdown of these two compounds and the properties of 1.5 mil films prepared therefrom are shown below:

|  | All-resin Compound | Modified Compound |
| --- | --- | --- |
| Maximum drawdown rate, from 20 mils to 1.5 mils (ft./min.) | 120 | 150+ |
| 1.5 mil Film: | | |
| kin. coeff. of friction | 0.45 | 0.25 |
| haze (percent) | 23 | 14 |
| light transmission (percent) | 23 | 56 |
| gloss (per mil) | 33 | 73 |

The coefficient of slip of a film prepared from a given compound will depend in part on the extrusion conditions used, e.g., die size, extrusion rate, extrusion temperature, drawdown rate, quenching temperature, etc. Since a variety of conditions, particularly a number of different extruders and die sizes were employed to prepare the films cited in the different examples, differences in coefficient of friction for a given composition from example to example should not be misconstrued as lack of reproducibility.

The following is a description of the various test methods employed for evaluating the properties described in the several examples.

(1) Melt index: determined according to ASTM Procedure D–1238–52T; (gives the number of grams of resin which extrude through a 0.0825" diameter orifice at 190° C. under 43.2 p.s.i. pressure in ten minutes).

(2) Bulk factor: determined according to ASTM Procedure D–1182–51T; this is the ratio of the actual density to the apparent density.

(3) Odor development: Five grams of resin ground to 20 mesh are dispersed on layers of glass wool (ca. 8 grams) in a 250 ml. Erlenmeyer fitted with feed and exit lines. Flask and contents are kept in a 140° C. bath while gaseous oxygen is passed through very slowly. The emergent gas stream is passed through 10 ml. of pure heavy mineral oil which scrubs out and retains any malodorous volatiles from the polyethylene and may be set aside for future comparison. The time in minutes to develop an objectional odor under these test conditions is reported. The figure "360+" means no odor was discernible after 360 minutes at which point the test is discontinued.

(4) Haze and light transmission: per ASTM Proc. D–1003–52.

(5) Gloss: is specular gloss per mil as determined with a Photovolt Glossmeter 660B (mfd. by Photovolt Corp., N.Y.C.). It is 1000 times the fraction of incident light reflected at the specular angle.

(6) Bag-drop impact: Bags (8" wide x 19" long) are formed by heat sealing the film and loaded with 10 lbs. of sand. The loaded bag is dropped onto a thick rigid steel plate in such a manner that the bag lands on its bottom. The bag is dropped when its bottom is one foot above the plate, then two feet above the plate, then three feet, etc. at intervals of one foot until failure occurs. Failures occurring only at a bag seam are omitted from the average unless the value exceeds the average of bags which did not fail at a seam. Any noticeable leakage of sand from the bag is regarded as failure.

(7) Flame treating for ink adhesion: A 3" x 6" rectangle of film is floated on water and a Bunsen flame is played across its surface for five seconds. The treated (i.e., flamed) surface is printed, a strip of "Scotch Tape" is pressed firmly and evenly over the printing and the tape is then yanked off rapidly. The degree to which the printing adheres to the polyethylene surface and resists removal therefrom by this Scotch Tape treatment is evaluated visually.

(8) Kinetic coefficient of friction: A 17" x 22" sample of film is taped smoothly, but without stretching, to the surface of a plane whose angle of inclination to the horizontal is accurately and reproducibly adjustable, with the machine direction (M.D.) of the film along the length of the plane. A 12" x 2¾" section of film is taped snugly, but without stretching, around a 2½" x 4" x 0.75" steel block (weighing approximately 1 kg.) encased in ⅛" sponge rubber with the M.D. of the film parallel to the length of the block. The film-covered block is allowed to slide freely from a standing start down the inclined plane with the plane at various angles of inclination, and the time to slide 2.5, 5.0, 7.5, 10.0 and 12.5 inches is noted. A fresh film on the block and a fresh portion of film on the plane are used for every slide. The average time in seconds to slide one inch is plotted against the tangent of the angle at which this reciprocal rate was determined. Angles are chosen so that at least two reciprocal rates above and two below 30 sec./in. are included. The kinetic coefficient of friction is numerically equal to the tangent corresponding to a reciprocal rate of 30 sec./inch as determined from the above curve. For films for which reciprocal rates below 30 sec./in. cannot be obtained, the tangent of the smallest angle at which the block will slide at least 12.5" is taken as the kinetic coefficient of friction.

(9) Static build-up: determined by the method of Military Specification mil-p-80A, except that 15 strokes were used instead of 100. Results reported in electrostatic units (e.s.u.) as read on an electrostatic voltmeter.

The polyethylene compositions of the present invention in granular form have better pourability than unmodified polyethylene granules. This improves their flow in bag or drum loading operations and through automatic feeders and reduces their tendency to bridge and jam in such feeders, extruder hoppers and the like. The improved bulk factor permits larger amounts to be packed in standard shipping containers. Also, less fines and "feathers" are formed during commercial granulating and dicing operations.

Extrusion characteristics of the novel polyethylene compositions are markedly superior. Extrusion rate in general is higher, by about seven percent, because of the improved (lower) bulk factor. Drawdown is much better, i.e., extruded webs can be drawn down further (to lower thickness) and at higher speeds (about 25–50 percent higher) without tearing or forming blow holes. Fewer holes, slits and other gross irregularities are caused by specks of mechanical impurities which may be present because the material, by virtue of its improved plasticity (higher melt index), is better able to flow around and engulf said specks. A wider range of extrusion temperatures can be used. The materials perform satisfactorily at lower temperature because of their improved melt flow; and they can be extruded at higher temperatures than are usually employed because of their superior slip attributes.

The novel polyethylene compositions have been found not to foul hot equipment such as calender rolls or extruders because of their improved heat stability. In fact, they can be used as cleaners to remove deposits left on such equipment by ordinary polyethylene compounds or vinyl compounds which have less heat stability.

Films prepared from these materials have excellent slip and are highly uniform and reproducible in this respect. They have kinetic coefficients of friction ranging from 0.5 to less than 0.1, depending on the particular composition; and the value exhibited by a given composition was the same to within 0.01–0.02 for a series of commercial scale runs as demonstrated by Example 6. Film appearance is improved. No striation of flow lines occurs because of the material's more favorable flow behavior; and gloss, clarity and light transmission are higher and haze is reduced. Impact strength is about 10 percent greater. Odor is more acceptable and the tendency to develop unpleasant odor on storage or heating is greatly reduced. Heat sealability is about the same to slightly better in some instances. Response to flame treatment for improved print adhesion and print adhesion are about the same. Surfaces do not accumulate electrostatic charges as readily; hence they do not attract as much dust. This also improves manipulation during subsequent processing and fabricating operations. Films prepared from the compositions of this invention are less flammable, for example the 1.5 mil film of Example 5 will not continue to burn after the ignition flame is removed. It is self-extinguishing as defined by Department of Commerce Test S-192-53. Greater stiffness of extruded and molded objects than has been attainable heretofore can be achieved by extruding and drawing at lower temperatures than were previously practicable.

What is claimed is:

1. A composition comprising a normally solid polymer of ethylene, from 0.005 percent to about 1.25 percent by weight of an amide of a water-insoluble aliphatic monocarboxylic acid having from 10 to 22, inclusive, carbon atoms in the molecule and from 0.003 percent to about 2 percent by weight of an anti-oxidant for polyethylene selected from the group consisting of 2-6-ditert.butyl-4-methyl phenol, wherein the phenolic properties of the phenolic hydroxyl group are modified by the presence of the alkyl groups on the phenolic ring, and secondary aromatic amines characterized by the formula

where R is selected from the group consisting of phenyl and naphthyl groups and R¹ is selected from the group consisting of hydrogen, hydroxyl, naphthylamino, phenylamino groups and alkyl radicals having from 4 to 8, inclusive, carbon atoms, all amounts being based on the weight of the solid polymer of ethylene.

2. A polyethylene composition comprising a normally solid polyethylene, from 0.005 percent to about 1.25 percent by weight of an amide of a water-insoluble aliphatic monocarboxylic acid having from 10 to 22, inclusive, carbon atoms in the molecule and from 0.003 percent to about 2 percent by weight of a 2-6-ditert.butyl-4-methyl phenol anti-oxidant for polyethylene, wherein the phenolic properties of the phenolic hydroxyl group of the phenol are modified by the presence of the alkyl groups on the phenolic ring, all amounts being based on the weight of the polyethylene.

3. A polyethylene composition comprising a normally solid polyethylene containing from 0.005 percent to about 1.25 percent by weight of an amide of a water-insoluble monocarboxylic acid having from 10 to 22 carbon atoms in the molecule and from 0.003 percent to about 2 percent by weight of a member of the group consisting of 2-6-ditert.butyl-4-methyl phenol and a secondary aromatic amine anti-oxidants for polyethylene having the formula

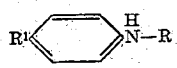

where R is selected from the group consisting of phenyl and naphthyl groups and R¹ is selected from the group consisting of hydrogen, hydroxyl, naphthylamino, phenylamino groups and alkyl radicals having from 4 to 8, inclusive, carbon atoms, all amounts based on the weight of the polyethylene.

4. Polyethylene film having a finite coefficient of friction below 0.5, said film containing from 0.003 percent to 2 percent by weight of a 2-6-ditert.butyl-4-methyl phenol anti-oxidant for polyethylene, wherein the phenolic properties of the phenolic hydroxyl group of the phenol is modified by the presence of the alkyl groups on the phenolic ring, and from about 0.005 percent to about 1.25 percent by weight of an amide of a water-insoluble aliphatic monocarboxylic acid having from 10 to 22, inclusive, carbon atoms in the molecule, all amounts based on the weight of the polyethylene.

5. Polyethylene film having a finite kinetic coefficient of friction below 0.5, said film containing from 0.005 percent to 1.25 percent by weight of an amide of a water-insoluble aliphatic monocarboxylic acid having from 10 to 22, inclusive, carbon atoms in the molecule and from 0.005 percent to 0.3 percent of a 2-6-ditert.butyl-4-methyl phenol antioxidant for polyethylene wherein the phenolic properties of the phenolic hydroxyl group of the phenol are modified by the presence of the alkyl groups on the phenolic ring, all amounts based on the weight of the polyethylene.

6. Polyethylene film having a finite kinetic coefficient of friction below 0.5, said film containing from 0.005 percent to 1.25 percent of at least one amide selected from the group consisting of oleamide, lauramide, stearamide and palmitamide and from 0.005 percent to 0.3 percent of 2,6-ditertiary butyl-4-methylphenol, all amounts based on the weight of the polyethylene.

7. Extrudable polyethylene composition comprising a normally solid polyethylene and dispersed therein from 0.005 percent to about 1.25 percent by weight of an amide of a water-insoluble aliphatic monocarboxylic acid having from 10 to 22, inclusive, carbon atoms in the molecule and from 0.003 percent to about two percent by weight of 2,6-ditertiary butyl-4-methylphenol, all amounts based on the weight of the polyethylene.

References Cited in the file of this patent

UNITED STATES PATENTS

| | | |
|---|---|---|
| 2,516,591 | Remington | July 25, 1950 |
| 2,530,769 | Hollis | Nov. 21, 1950 |
| 2,632,751 | Anderson | Mar. 24, 1953 |
| 2,654,722 | Young et al. | Oct. 6, 1953 |
| 2,770,608 | Barker | Nov. 13, 1956 |